(No Model.) 2 Sheets—Sheet 2.
E. M. SHENEMAN.
DOUGH RAISER.
No. 549,541. Patented Nov. 12, 1895.
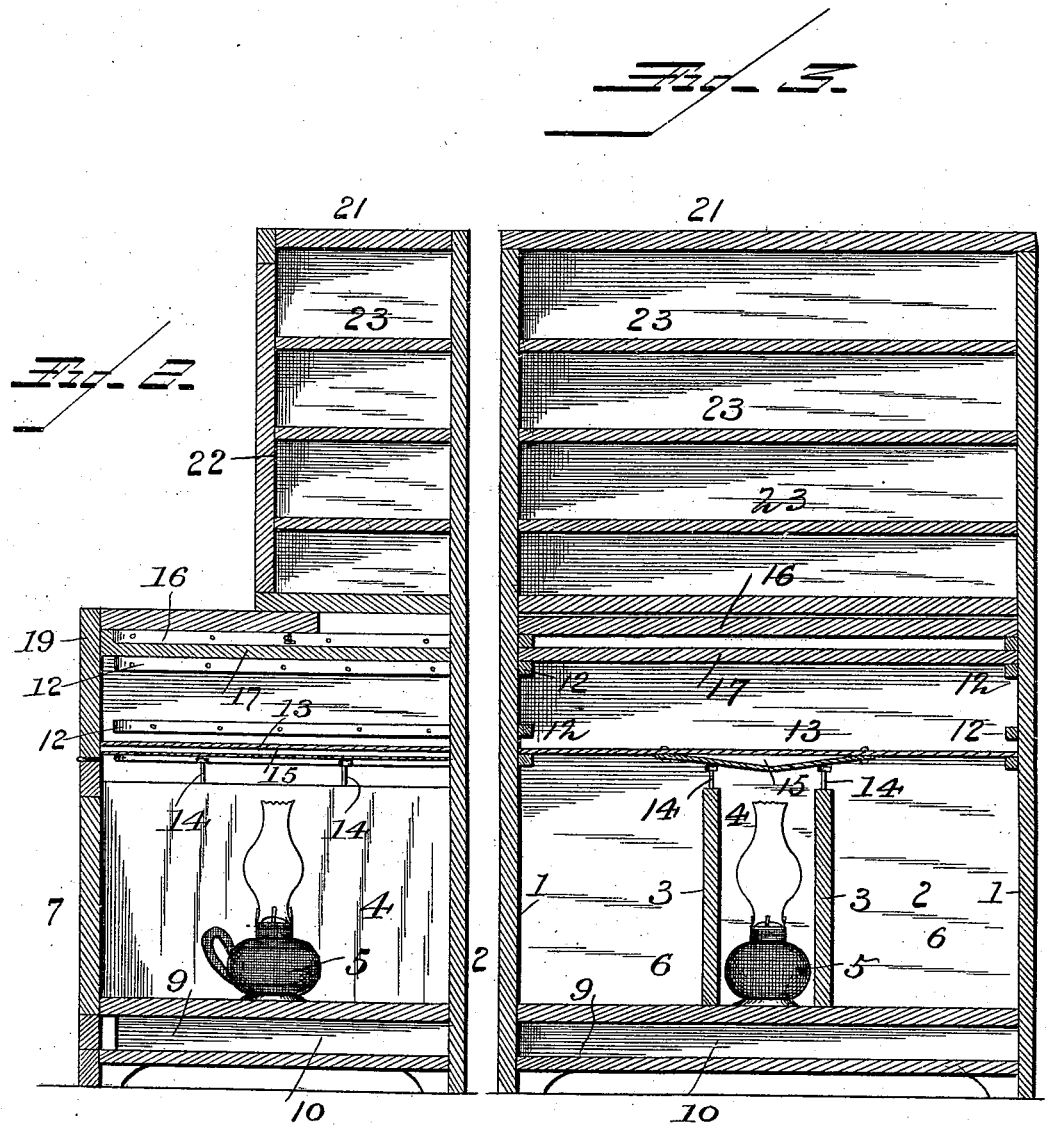
Witnesses
F. L. Ouyand
[signature]
Inventor
Emanuel M Sheneman
By [signature]
Attorney

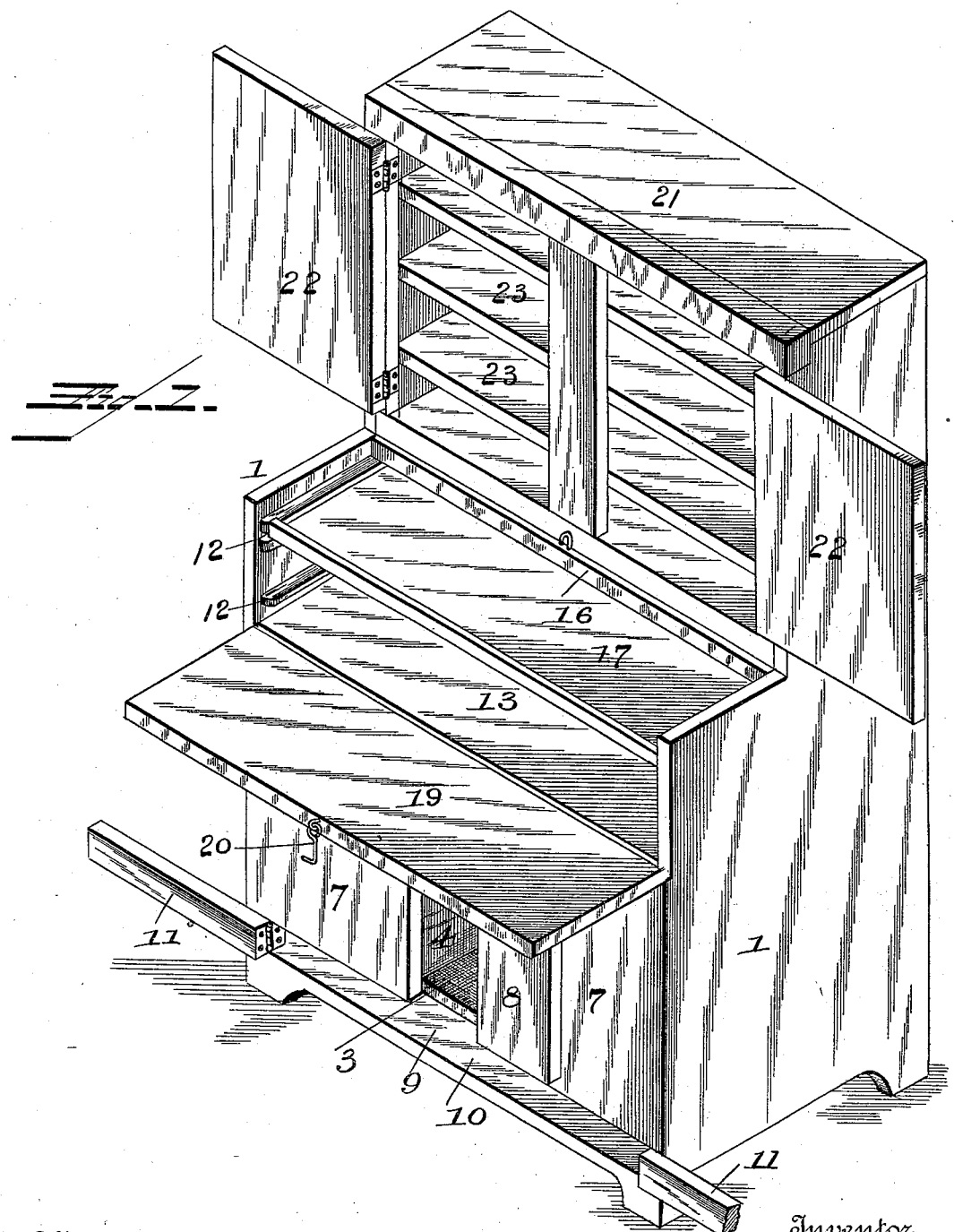

UNITED STATES PATENT OFFICE.

EMANUEL M. SHENEMAN, OF PHARISBURG, OHIO.

DOUGH-RAISER.

SPECIFICATION forming part of Letters Patent No. 549,541, dated November 12, 1895.

Application filed March 20, 1895. Serial No. 542,564. (No model.)

*To all whom it may concern:*

Be it known that I, EMANUEL M. SHENEMAN, a citizen of the United States, residing at Pharisburg, in the county of Union and State of Ohio, have invented certain new and useful Improvements in Dough-Raisers; and I do declare the following to be a full, clear, and exact description of the invention, such as will enable others skilled in the art to which it appertains to make and use the same.

My invention relates to a dough-raiser.

The object of the invention is to provide a cabinet for supplying a uniform heat for raising dough, which cabinet may also be used for the purpose of storing away and keeping eatables from freezing in the winter, as well as to provide means for the storage of flour in bulk, spices, sugar, pastry, and cooking utensils.

With these objects in view the invention consists in certain features of construction and combination of parts, which will be hereinafter fully described and claimed.

In the accompanying drawings, Figure 1 is a front view of my improved dough-raiser, showing the doors of the cupboard, the door of the raising-chamber, and the door of the heating-chamber open. Fig. 2 is a longitudinal vertical sectional view with the doors closed. Fig. 3 is a cross-sectional view taken at right angles to Fig. 2.

In the drawings, 1 denotes the sides, and 2 the back, of the dough-raiser.

3 denotes two partitions secured within the dough-raiser to form a heating-chamber 4, in which is adapted to be placed any suitable heating means, and which I have shown in the present instance as a lamp 5. These partitions, taken in connection with the sides of the raiser, form compartments 6, which are adapted to contain flour in bulk or any other cereal or article of food desired to be kept warm. 7 denotes the fronts of said compartments, which are secured to the front edges of the sides and partitions.

8 denotes a hinged door to close the heating-chamber.

9 denotes a false bottom, which is secured to the sides and back of the cabinet and which forms a compartment 10. This compartment serves to prevent any moisture from penetrating the flour receptacles or bins and also serves as a place for the storage of cooking utensils, and is provided with hinged doors 11.

Secured near the upper ends of the sides 1, near their tops, are guides 12, the lower one of which is adapted to support a metallic heat-deflecting plate 13, which extends entirely across the upper portion of the frame. The center of this metallic plate is supported and spaced away from the upper ends of the partitions by pins 14, and is provided with a bulged metallic strip 15 on its under face, which is directly over the heating or lamp chamber, and thereby equalizing the heat or distributing it evenly throughout its entire surface; otherwise the plate directly over the heating-chamber would be heated to a higher temperature than would its other surfaces, and thus imperfectly raise the dough.

16 denotes a sliding top, which is mounted upon the top guides of the sides.

17 denotes a bread-board, which is adapted to slide on the middle guide, and 19 denotes a hinged front, which is adapted to be swung up against the upper ends of the sliding top and be connected therewith by a hook 20, whereby the raising-chamber is closed.

21 denotes a cover supported on the top of the raising-chamber and provided with doors 22. This cupboard may be provided with shelves 23 and doors 24 to contain spices, sugar, pies, and any like articles.

In operation the front of the raising-chamber is swung down and the sliding top slid rearward and the dough or mixer board slid forward. After the flour has been mixed on the board it is then placed in pans, which are placed upon the deflecting-plate in the raising-chamber. The top is then slid forward and the front swung upward and secured thereto. The lamp is then placed in the heating-chamber, and the heat therefrom will ascend and be deflected against the entire surface of the plate, and the heat will be uniformly distributed thereon owing to the bulged strip secured to the under side of the plate. In the absence of this strip it is evident that the heat would be greater directly over the heating-chamber, and therefore would not uniformly raise the dough placed upon the plate; so it will be seen that this bulged strip is an important feature of my invention. When desired, cooked or uncooked articles of food may be placed upon the deflecting-plate and be kept from freezing during the cold weather.

From the foregoing description, taken in connection with the accompanying drawings, the operation of the invention will be readily understood without requiring further explanation.

The device is simple of construction, durable in use, and inexpensive of manufacture and will be found to be a very useful piece of furniture for the kitchen, as it not only comprises within itself a dough-raiser, but affords means for the storage of the various cooking utensils, as well as articles of food, which latter will be kept warm during the cold weather, and thus overcoming the annoyance of their freezing.

Having thus described my invention, I claim and desire to secure by Letters Patent of the United States—

A dough raiser comprising a cabinet, having a sliding dough board at its top, a hinged door adapted to be connected with the dough board, a heating chamber, compartments separated from the heating chamber by partitions, a plate supported above the heating chamber and compartments and in conjunction with the sides and back of the cabinet and the hinged door and sliding board forming the raising chamber, said plate being supported above the heating chamber and compartments and provided with a deflecting bottom, whereby the heat from the chamber is equally distributed against the plate and directed into the compartments, substantially as set forth.

In testimony whereof I affix my signature in presence of two witnesses.

EMANUEL M. SHENEMAN.

Witnesses:
Z. X. COREY,
MARGARET STRICKER.